United States Patent
Yamaguchi et al.

(10) Patent No.: US 9,500,907 B2
(45) Date of Patent: Nov. 22, 2016

(54) LIQUID CRYSTAL DISPLAY COMPRISING FIRST AND SECOND ALIGNMENT FILMS HAVING FIRST AND SECOND ANCHORING STRENGTHS RESPECTIVELY AND MANUFACTURING METHOD THEREOF

(71) Applicant: Japan Display Inc., Minato-ku (JP)

(72) Inventors: Hidemasa Yamaguchi, Tokyo (JP); Masato Imai, Tokyo (JP); Shingo Kataoka, Tokyo (JP); Yusuke Watanabe, Tokyo (JP); Fumihito Shibano, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/627,641

(22) Filed: Feb. 20, 2015

(65) Prior Publication Data

US 2015/0268494 A1   Sep. 24, 2015

(30) Foreign Application Priority Data

Mar. 19, 2014   (JP) .................................. 2014-056147

(51) Int. Cl.
*G02F 1/1337*   (2006.01)
*G02F 1/1343*   (2006.01)

(52) U.S. Cl.
CPC ....... *G02F 1/1337* (2013.01); *G02F 1/133784* (2013.01); *G02F 1/133788* (2013.01); *G02F 1/134363* (2013.01); *G02F 2001/133773* (2013.01)

(58) Field of Classification Search
CPC .......... G02F 1/133345; G02F 1/1337; G02F 1/133788; G02F 2001/133738

USPC .......................................................... 349/123
See application file for complete search history.

(56) References Cited

U.S. PATENT DOCUMENTS

| | | | | |
|---|---|---|---|---|
| 2005/0248702 A1* | 11/2005 | Hoshino | ........... | G02F 1/133553 349/113 |
| 2007/0097305 A1* | 5/2007 | Lin | .................... | G02F 1/134363 349/141 |
| 2012/0026442 A1* | 2/2012 | Nakanishi | ............ | C09K 19/322 349/123 |
| 2012/0229745 A1* | 9/2012 | Harada | ............. | G02F 1/133707 349/126 |

FOREIGN PATENT DOCUMENTS

JP   2007-033672 A   2/2007

* cited by examiner

*Primary Examiner* — Paul Lee
(74) *Attorney, Agent, or Firm* — Oblon, McClelland, Maier & Neustadt, L.L.P.

(57) ABSTRACT

According to one embodiment, a liquid crystal display includes a first substrate, a second substrate and a liquid crystal layer. The first substrate includes a first line, a second line, a switching element, a pixel electrode, a common electrode, and a first alignment film. The second substrate includes a second alignment film. The liquid crystal layer includes a liquid crystal molecule kept between the first alignment film and the second alignment film. First anchoring strength is provided on the first alignment film which is a photo-alignment film, second anchoring strength is provided on the second alignment film which is a rubbing alignment film, and the first anchoring strength is substantially equal to or greater than the second anchoring strength.

7 Claims, 7 Drawing Sheets

LIQUID CRYSTAL DISPLAY COMPRISING FIRST AND SECOND ALIGNMENT FILMS HAVING FIRST AND SECOND ANCHORING STRENGTHS RESPECTIVELY AND MANUFACTURING METHOD THEREOF

CROSS-REFERENCE TO RELATED APPLICATIONS

This application is based upon and claims the benefit of priority from Japanese Patent Application No. 2014-056147, filed Mar. 19, 2014, the entire contents of which are incorporated herein by reference.

FIELD

Embodiments described herein relate generally to a liquid crystal display and a manufacturing method thereof.

BACKGROUND

Recently, flat displays have been actively developed. Among them, liquid crystal displays have attracted attention because of their advantages of being light and thin and having low energy requirements. In particular, in active-matrix liquid crystal displays in which a switching element is incorporated into each pixel, a structure in which a lateral electric field (including a fringe electric field) such as an in-plane switching (IPS) mode and a fringe field switching (FFS) mode is used is attracting attention.

Such a liquid crystal display of the lateral electric field mode includes an array substrate which includes a pixel electrode and a common electrode and on a surface of which a first alignment film is formed, a counter substrate in which a second alignment film facing the first alignment film is formed, and a liquid crystal layer enclosed in a cell gap formed between the first alignment film and the second alignment film, wherein a liquid crystal molecule of the liquid crystal layer is switched in a lateral electric field substantially parallel to the main surface of the array substrate.

The alignment treatment by, for example, a rubbing method or a photo-alignment method is performed on each alignment film. If the alignment treatment by the rubbing method is performed on the alignment film, an area in which alignment capability is not fully provided on the alignment film may be produced because of projections and depressions on the alignment film surface. Since a liquid crystal molecule switched by an electric field is hard to return to an initial alignment direction near such an area, so-called burn-in easily occurs. Further, a difference in transmittance is easily visually recognized as display unevenness in a portion in which a difference occurs in the alignment capability because of the projections and depressions in a rubbing treatment.

Further, if the alignment treatment by the photo-alignment method is performed on the alignment film, a color filter may be faded by ultraviolet irradiation of the treatment processing, impurities may be produced by a decomposed member formed of an organic material on a substrate, and the produced impurities may be eluted to the liquid crystal layer.

DETAILED DESCRIPTION

In general, according to one embodiment, a liquid crystal display includes a first substrate, a second substrate and a liquid crystal layer. The first substrate includes a first line, a second line, a switching element electrically connected to the first line and the second line, a pixel electrode electrically connected to the switching element, a common electrode formed through a plurality of pixels, and a first alignment film provided above the pixel electrode and the common electrode. The second substrate includes a second alignment film facing the first alignment film. The liquid crystal layer includes a liquid crystal molecule kept between the first alignment film and the second alignment film. First anchoring strength is provided on the first alignment film which is a photo-alignment film, second anchoring strength is provided on the second alignment film which is a rubbing alignment film, and the first anchoring strength is substantially equal to or greater than the second anchoring strength.

One embodiment will be hereinafter described with reference to the accompanying drawings.

It should be noted that disclosure to be made is merely an example, and a change which is to be properly made with the gist of the invention maintained and can be easily conceived by a person with ordinary skill in the art is naturally within the scope of the present invention. Further, the drawings will be schematically shown in terms of a width, thickness, shape, etc., in comparison with an actual form for clarification of description; however, they are just examples and do not limit interpretation of the present invention. Moreover, the same or similar structural elements will be denoted by the same reference numbers in the specification and each of the drawings, and their detailed description may be omitted.

Figure 1:
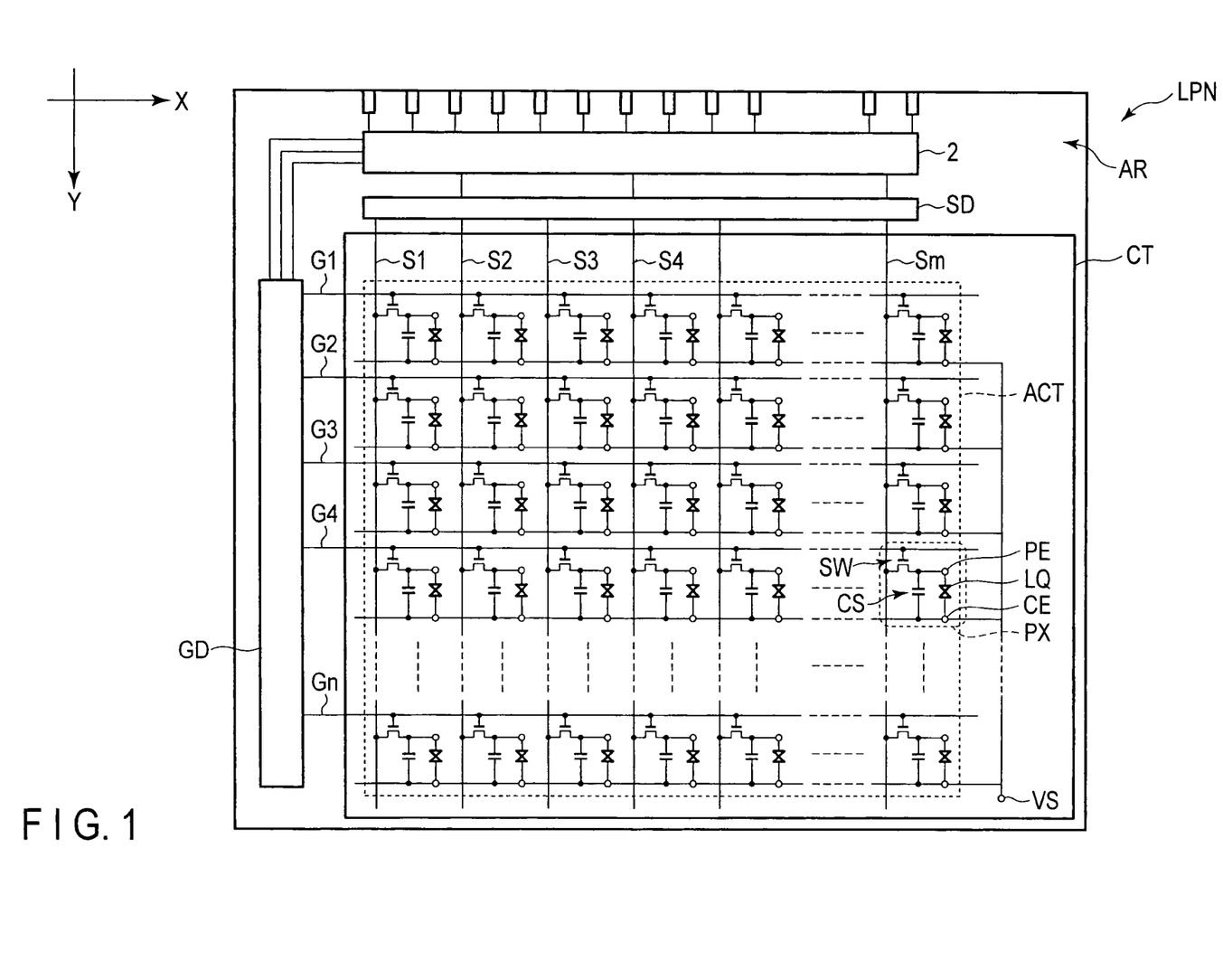
FIG. 1 schematically shows a configuration and an equivalent circuit of a liquid crystal panel of a liquid crystal display according to one embodiment.

FIG. 1 schematically shows a configuration and an equivalent circuit of a liquid crystal panel LPN of a liquid crystal display of this embodiment. The liquid crystal display includes an active-matrix liquid crystal panel LPN.

The liquid crystal panel LPN includes an array substrate AR (first substrate), a counter substrate CT (second substrate) arranged to face the array substrate AR and a liquid crystal layer LQ kept between the array substrate AR and the counter substrate CT. The liquid crystal panel LPN includes an active area ACT in which an image is displayed. The active area ACT is constituted of a plurality of pixels PX arranged in an m×n matrix (m and n are positive integers).

In the active area ACT, the array substrate AR includes a plurality of gate lines G (G1 to Gn) extending along an X-direction (first direction), a plurality of source lines S (S1 to Sm) extending along a Y-direction (second direction) orthogonal to the X-direction, a plurality of pixel areas (pixels) PX surrounded by the adjacent gate lines G and the adjacent source lines S, a switching element SW electrically connected to a gate line G and a source line S in each pixel PX, a pixel electrode PE electrically connected to the switching element SW in each pixel PX, a common electrode CE facing the pixel electrode PE, etc. The X-direction is a direction in which the plurality of source lines S are arranged, and the Y-direction is a direction in which the plurality of gate lines G are arranged. Gate lines G or source lines S need not linearly extend. They may be partially bent.

Common electrodes CE are commonly formed in the plurality of adjacent pixels PX. Although the common electrodes CE are commonly formed in pixels adjacent in the X-direction in this embodiment, they may be commonly formed in pixels adjacent in the Y-direction, or may be commonly formed in a plurality of pixels adjacent in the X- and Y-directions. Further, they may be commonly formed in all pixels.

The pixel electrode PE is formed in an island shape in each pixel PX. A holding capacitor CS is formed between the pixel electrode PE and the common electrode CE facing across an insulating film, as will be described.

Each gate line G is pulled out of the active area ACT and connected to a gate driver GD. Each source line S is pulled out of the active area ACT and connected to a source driver SD. The common electrode CE is electrically connected to a feeder VS to which common voltage is supplied. For example, at least a part of the gate driver GD and the source driver SD is formed on the array substrate AR and they are connected to a driving IC chip 2. In the example shown in the figure, the driving IC chip 2 which is a signal source necessary for driving the liquid crystal panel LPN is mounted on the array substrate AR outside the active area ACT of the liquid crystal panel LPN.

The liquid crystal panel LPN in the example shown in the figure can be applied to an IPS mode or an FFS mode which is one mode thereof. The liquid crystal panel LPN of this type switches liquid crystal molecules constituting the liquid crystal layer LQ mainly using a lateral electric field formed between the pixel electrode PE and the common electrode CE. In this embodiment, the FFS mode is hereinafter applied to the liquid crystal panel LPN as an example.

Figure 2:
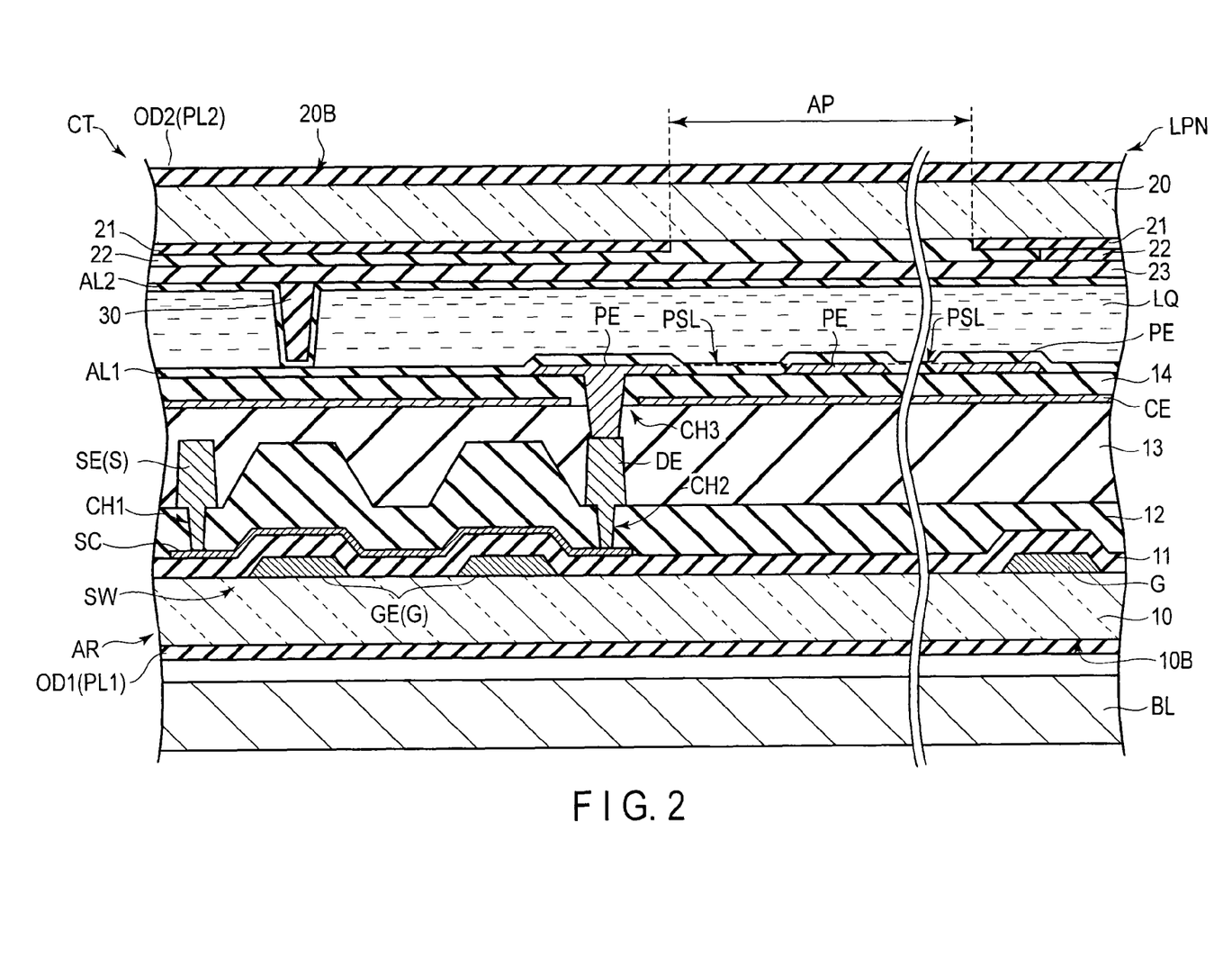
FIG. 2 is a schematic sectional view of the liquid crystal display according to the embodiment.

FIG. 2 is a schematic sectional view of the liquid crystal display according to this embodiment. In the figure, a position, scale, etc., of each element are properly adjusted for simplification. The array substrate AR is formed using a light transmissive first substrate 10 such as a glass substrate. The array substrate AR includes the switching element SW, the common electrode CE, the pixel electrode PE, a first insulating film 11, a second insulating film 12, a third insulating film 13, a fourth insulating film 14, a first alignment film AL1, etc., on a side facing the counter substrate CT of the first substrate 10.

The switching element SW of this embodiment is a bottom-gate- and a double-gate-type thin-film transistor. The switching element SW may be a top-gate-type thin-film transistor. The switching element SW may be a single-gate-type thin-film transistor.

The switching element SW includes, for example, a gate electrode GE, the first insulating film 11, a semiconductor layer SC, a source electrode SE and a drain electrode DE. The gate electrode GE is, for example, part of the gate line G and arranged on the first substrate 10. The gate electrode GE is covered with the first insulating film 11. The first insulating film 11 is arranged to cover the gate electrode GE and the upper surface of the first substrate 10. The semiconductor layer SC, partially facing the gate electrode GE, is arranged on the first insulating film 11. The semiconductor layer SC is formed of, for example, polysilicon, amorphous silicon, oxide semiconductor, etc. The semiconductor layer SC is covered with the second insulating film 12. The second insulating film 12 is formed of silicon oxide or silicon nitride, and arranged also on the first insulating film 11.

The source electrode SE and the drain electrode DE are formed on the second insulating film 12. The source electrode SE is, for example, part of the source line S and contacts the semiconductor layer SC through contact hole CH1 penetrating the second insulating film 12. The drain electrode DE contacts the semiconductor layer SC through contact hole CH2 penetrating the second insulating film 12.

The switching element SW is covered with the third insulating film 13. The third insulating film 13 is arranged also on the second insulating film 12. The third insulating film 13 is formed of, for example, a transparent resin material, and thus, the upper surface of the third insulating film 13 is flat.

The common electrode CE is formed on the third insulating film 13 over the whole active area other than a contacting area of the pixel electrode PE and the drain electrode DE. That is, the common electrode CE is formed in a plurality of adjacent pixels PX and covers an area overlapping with the source line S and the gate line G. The common electrode CE is formed of a transparent electrical conducting material, for example, indium tin oxide (ITO). An electric field generated on the source line S, the gate line G, etc., arranged on a side of the first substrate 10 when current is passed is shielded by the common electrode CE and hardly reaches the liquid crystal layer LQ.

The common electrode CE is covered with the fourth insulating film 14. The fourth insulating film 14 is arranged also on the third insulating film 13. The fourth insulating film 14 functions as an interlayer insulating film located between the pixel electrode PE and the common electrode CE. The fourth insulating film 14 is constituted of, for example, silicon nitride (SiNx) and formed to be thinner than the third insulating film 13.

Contact hole CH3 penetrating to the drain electrode DE is formed on the third insulating film 13 and the fourth insulating film 14. The common electrode CE is opened to surround contact hole CH3.

The pixel electrode PE is formed on the fourth insulating film 14 and faces the common electrode CE. The pixel electrode PE forms a pixel capacitor (holding capacitor) CS necessary for driving liquid crystal molecules of the liquid crystal layer LQ between the pixel electrode PE and the common electrode CE facing the pixel electrode PE across the fourth insulating film 14. Further, the pixel electrode PE has a slit PSL facing the common electrode CE across the fourth insulating film 14. The pixel electrode PE is electrically connected to the drain electrode DE through contact hole CH3. The pixel electrode PE is formed of a transparent electrical conducting material, for example, ITO.

The pixel electrode PE is covered with the first alignment film AL1. The first alignment film AL1 also covers the fourth insulating film 14. The first alignment film AL1 is formed of, for example, a material having horizontal orientation such as polyimide, arranged in the uppermost layer of the array substrate AR and contacts the liquid crystal layer LQ.

On the other hand, the counter substrate CT is formed using a light transmissive second substrate 20 such as a glass substrate. The counter substrate CT includes a black matrix 21 which is a light shielding layer, a color filter 22, an overcoat layer 23, a columnar spacer 30, a second alignment film AL2, etc., on a side facing the array substrate AR of the second substrate 20.

The black matrix 21 is provided in a position overlapping with line portions such as the gate line G, the source line S and the switching element SW provided on the array substrate AR when both of the substrates are stacked. The black matrix 21 defines an aperture AP in the pixel area.

The color filter 22 is formed in the aperture AP and extends also on the black matrix 21. The color filter 22 is formed of resin materials colored in a plurality of colors different from each other, for example, three primary colors of red, blue and green. A boundary of colors in the color filter 22 is present in a position overlapping with the black matrix 21.

The overcoat layer 23 covers the color filter 22. Although it is simplified in FIG. 2, projections and depressions are produced at boundaries, etc., on a surface of the color filter 22 on the side of the array substrate AR. The overcoat layer 23 flattens the projections and depressions on the surface of the color filter 22. The overcoat layer 23 is formed of, for example, a transparent resin material.

The columnar spacer 30 constituted of, for example, a resin material is formed in a position overlapping with the black matrix 21 on the overcoat layer 23. That is, in this embodiment, the columnar spacer 30 is formed on the counter substrate CT. The columnar spacer 30 may be formed on the array substrate AR as another embodiment.

The surfaces of the overcoat layer 23 and the columnar spacer 30 are covered with the second alignment film AL2. The second alignment film AL2 is formed of, for example, a material having horizontal orientation such as polyimide.

The array substrate AR and the counter substrate CT are stacked such that the first alignment film AL1 and the second alignment film AL2 face each other. A tip of the columnar spacer 30 contacts the first alignment film AL1 on the side of the array substrate AR, and a gap defined to be a predetermined cell gap (cell gap length) is formed between the array substrate AR and the counter substrate CT. A seal material is provided in a peripheral portion of either the array substrate AR or the counter substrate CT to surround at least a display area. The array substrate AR and the counter substrate CT are bonded by the seal material with the cell gap kept. The liquid crystal layer LQ is constituted of a liquid crystal material enclosed in the gap provided between the substrates. In this embodiment, the main material of the liquid crystal material is liquid crystal molecules having negative dielectric anisotropy (negative type liquid crystal molecules).

A backlight BL is arranged on the back of the liquid crystal panel LPN. For example, a light-emitting diode (LED) can be used as a light source of the backlight BL.

A first optical elements OD1 including a first polarizer PL1 is arranged on an external surface of the array substrate AR, that is, an external surface 10B of the first substrate 10. Further, a second optical elements OD2 including a second polarizer PL2 is arranged on an external surface of the counter substrate CT, that is, an external surface 20B of the second substrate 20. A first axis of polarization of the first polarizer PL1 and a second axis of polarization of the second polarizer PL2 are in a cross-Nicol positional relationship in which axes of polarization (absorption axes) are orthogonal to each other in planar view. The first optical elements OD1 and the second optical elements OD2 may further include a retardation film.

Alignment treatment is performed on the first alignment film AL1 and the second alignment film AL2 in directions parallel to each other on a surface parallel to the main surface of substrate (X-Y plane). For example, the direction of the alignment treatment of the first alignment film AL1 and the second alignment film AL2 is a direction parallel to the X-direction (that is, direction in which source lines S are arranged).

For example, the first axis of polarization of the first polarizer PL1 is set to be parallel to the direction of the alignment treatment of the first alignment film AL1, and the second axis of polarization of the second polarizer PL2 is set to be orthogonal to the direction of the alignment treatment of the first alignment film AL1.

Figure 3:
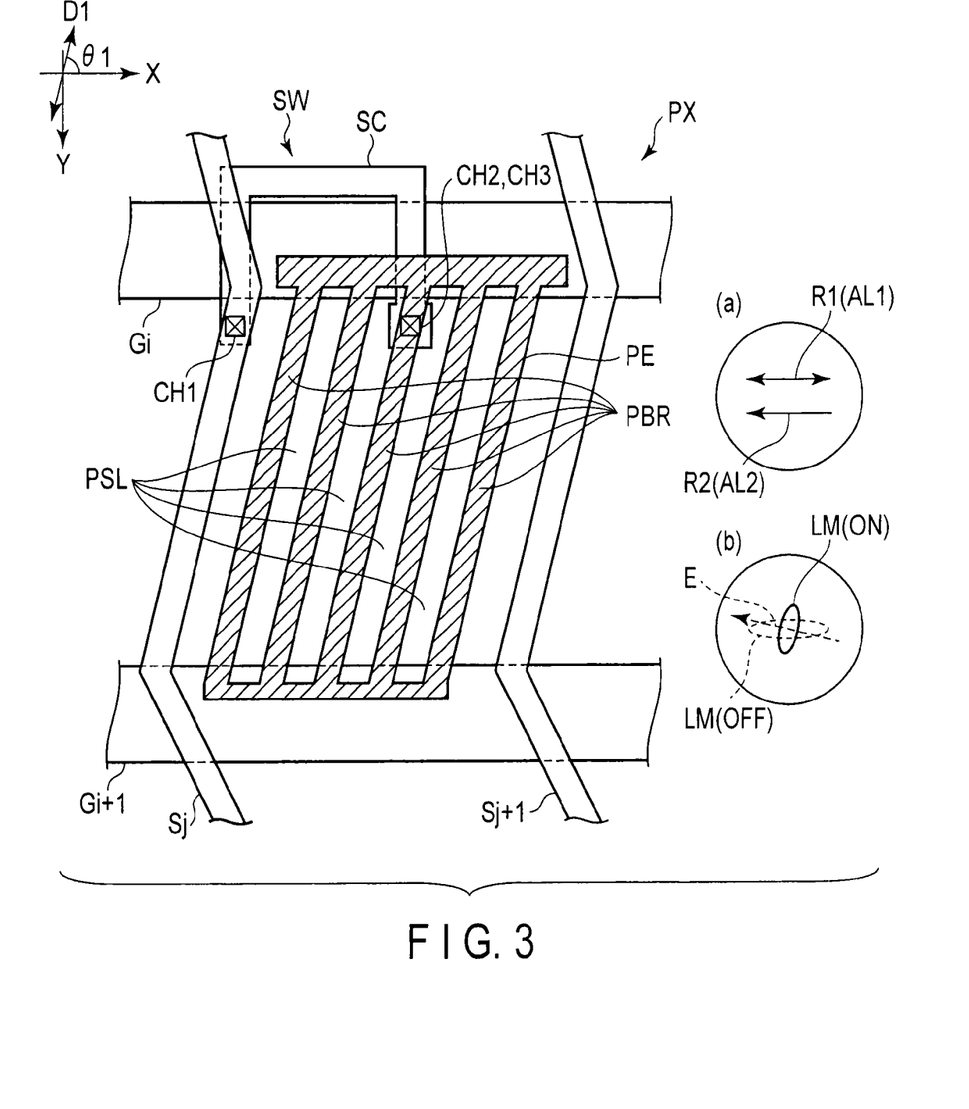
FIG. 3 is a plan view schematically showing one pixel formed on an array substrate in the embodiment.

FIG. 3 is a schematic plan view showing a structure of one pixel PX on the array substrate AR from the perspective of the side of the counter substrate CT. Here, only a main portion necessary for description is shown.

An area of the pixel PX shown in FIG. 3 is defined by gate lines Gi and Gi+1 (i is a positive integer) and source lines Sj and Sj+1 (j is a positive integer). Gate lines Gi and Gi+1 linearly extend along the X-direction, and source lines Sj and Sj+1 are bent and extend along the Y-direction.

The semiconductor layer SC constituting the switching element SW is bent and formed to overlap with the gate line Gi twice. The semiconductor layer SC is electrically connected to the source line Sj through contact hole CH1. Further, the semiconductor layer SC is electrically connected to the pixel electrode PE through contact holes CH2 and CH3.

The pixel electrode PE includes a plurality of branches PBR extending from above the gate line Gi to above the gate line Gi+1 along a first extending direction D1 inclined counterclockwise angle θ1 greater than or equal to 45° relative to the X-direction.

Angle θ1 is an angle nearly perpendicular, for example, approximately 75 to 85°. The pixel electrode PE includes four slits PSL extending from one edge to the other edge in the Y-direction. The slits PSL have the same shape and their long axes are inclined counterclockwise angle θ1 relative to the X-direction. In the example shown in the figure, each of the source line Sj and Sj+1 extends along the first extending direction D1 in a position between the gate line Gi and the gate line Gi+1. Further, each of the slits PSL also extends along the first extending direction D1.

Accordingly, the side edge of each of the branches PBR along the slits PSL (or side edge of each of the slits PSL) is parallel to the first extending direction D1 in planar view. When voltage is applied to the pixel electrode PE, a fringe electric field is generated between the pixel electrode PE and the common electrode CE through the slits PSL. The fringe electric field is perpendicular to the first extending direction D1 in planar view.

Since negative liquid crystal molecules are used in this embodiment, an angle between the direction of the fringe electric field and that of initial alignment is greater than or equal to zero and less than 45°.

Further, although longitudinal ends of each of the branches PBR of the pixel electrode PE are connected in this embodiment, a structure in which either of them is not connected and extends with intervals kept between the slits PSL can be adopted.

The number of branches PBR of the pixel electrode PE can be one, not at least two. In this case, spaces on both sides of the one branch are referred to as slits. Further, a middle portion or longitudinal ends of each of the branches PBR (slits PSL) can be bent. The combination thereof can also be adopted, that is, the middle portion and longitudinal ends can be bent. In this case, the bent portions of the longitudinal ends are preferably in the same direction as that of the middle portion, and bent at an angle larger than the bending angle of the middle portion.

For example, as shown in (a) of FIG. 3, alignment treatment is performed on the first alignment film AL1 along a first alignment axis R1 parallel to the X-direction in the X-Y plane, and alignment treatment is performed on the second alignment film AL2 along a second alignment axis R2 opposite to the first alignment axis R1 in the X-Y plane.

In this embodiment, the alignment treatment of the second alignment film AL2 is performed by performing rubbing treatment on the second alignment film AL2 from one side to the other side on an axis parallel to the first alignment axis R1. Thus, the second alignment axis has an alignment direction conforming to the rubbing direction of the second alignment film AL2 indicated by, for example, R2 in (a) of FIG. 3.

A liquid crystal molecule LM of the liquid crystal layer LQ is oriented such that its long axis faces the first alignment axis R1 of the first alignment film AL1 and the second alignment axis R2 of the second alignment film AL2, as indicated by broken lines in (b) of FIG. 3 in a state where voltage is not applied to the liquid crystal layer LQ, that is, in a state where an electric field is not formed between the pixel electrode PE and the common electrode CE (off state). The off state corresponds to an initial alignment state, and the alignment direction of the liquid crystal molecule LM in the off state corresponds to an initial alignment direction.

Part of backlight from the backlight BL is incident on the liquid crystal panel LPN through the first polarizer PL1 in the off state in which the voltage is not applied to the pixel electrode PE. Light incident on the liquid crystal panel LPN is linear polarization orthogonal to the first axis of polarization of the first polarizer PL1. The polarization state of the linear polarization does not substantially change when the linear polarization passes through the liquid crystal panel LPN in the off state. Thus, the linear polarization passing through the liquid crystal panel LPN is absorbed by the second polarizer PL2 which is in a cross-Nicol positional relationship with the first polarizer PL1 (black display).

On the other hand, a fringe electric field is formed between the pixel electrode PE and the common electrode CE in a state where a potential difference is formed between the pixel electrode PE and the common electrode CE (on state). A plurality of liquid crystal molecules LM constituting the liquid crystal layer LQ are affected by the fringe electric field, and rotate as indicated by a solid line in (b) of FIG. 3 in planar view.

Since, as described above, the liquid crystal layer LQ has negative dielectric anisotropy in this embodiment, the liquid crystal molecule LM rotates such that its long axis towards a direction perpendicular to that of an electric field in planar view when the electric field is applied to the liquid crystal layer LQ. Thus, the liquid crystal molecule LM is oriented in a direction in which its long axis crosses an electric line of force E of a lateral electric field. Further, if the FFS mode is used for driving the liquid crystal layer LQ as in this embodiment, the liquid crystal molecule LM rotates in planar view and slightly stands along the direction of the fringe electric field when the fringe electric field is generated. Thus, the length of the liquid crystal molecule LM after rotation (on state) in the long axis direction is shown to be shorter than that of the liquid crystal molecule LM before rotation (off state) in (b) of FIG. 3 in which the liquid crystal molecule LM is shown in planar view.

In the on state, the linear polarization orthogonal to the first axis of polarization of the first polarizer PL1 is incident on the liquid crystal panel LPN, and the polarization state changes in accordance with an alignment state (or retardation of the liquid crystal layer) of the liquid crystal molecule LM when the linear polarization passes through the liquid crystal layer LQ. Thus, in the on state, at least a part of light passing through the liquid crystal layer LQ is turned into a polarization state to be orthogonal to the axis of polarization of the second polarizer PL2, and, as a result, passes through the second polarizer PL2 (white display).

Pixels PX with such a structure are formed in the active area ACT. M pixels are successively formed in the X-direction, and n pixels are successively formed in the Y-direction.

Of pixel columns of n lines arranged in the Y-direction, for example, the pixel electrode PE in the shape shown in FIG. 3 can be formed on odd lines, and a pixel electrode PE with a shape obtained by flipping the shape of the pixel electrode PE relative to an axis parallel to the Y-direction can be arranged on even lines.

Figure 4:
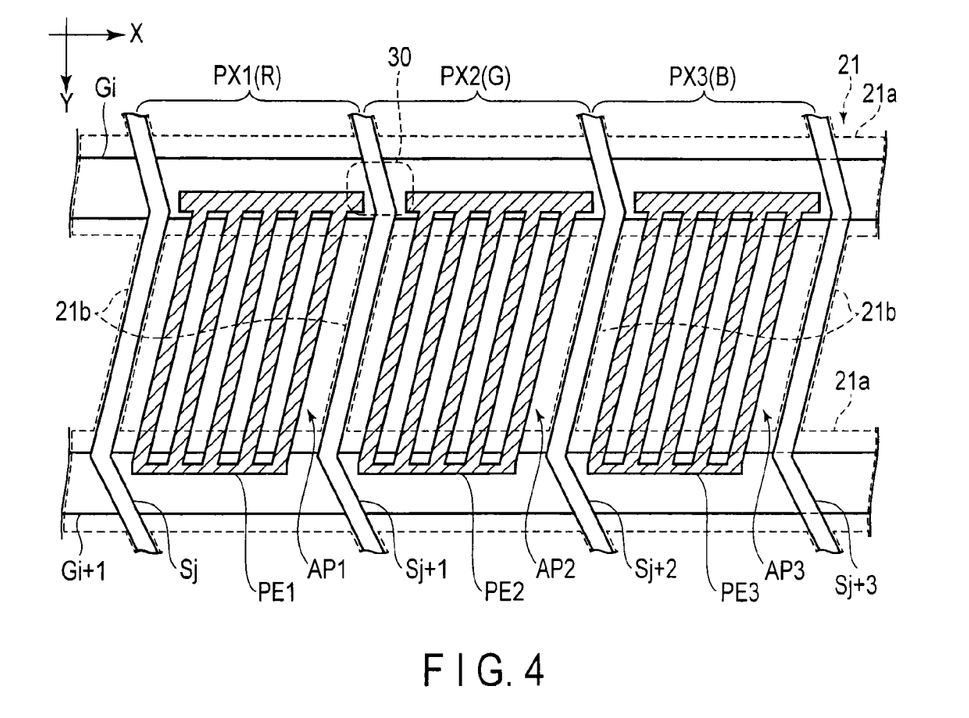
FIG. 4 is a plan view schematically showing three pixels formed on an array substrate in the embodiment.

Subsequently, the relationship between a pixel PX on the array substrate AR and the black matrix 21 and the columnar spacer 30 provided on the counter substrate CT will be described. FIG. 4 is a schematic plan view showing three pixels PX1 to PX3 successively formed on the array substrate AR in the X-direction from the perspective of the side of the counter substrate CT. Here, only a main portion necessary for description is shown.

Pixel PX1 is a pixel whose area is defined by gate lines Gi and Gi+1 and source lines Sj and Sj+1, and includes pixel electrode PE1 in the pixel. The color filter 22 arranged to face pixel PX1 is colored in red. That is, pixel PX1 is a pixel for displaying a red color (R).

Pixel PX2 is a pixel whose area is defined by gate lines Gi and Gi+1 and source lines Sj+1 and Sj+2, and includes pixel electrode PE2. The color filter 22 arranged to face pixel PX2 is colored in green. That is, pixel PX2 is a pixel for displaying a green color (G).

Pixel PX3 is a pixel whose area is defined by gate lines Gi and Gi+1 and source lines Sj+2 and Sj+3, and includes pixel electrode PE3. The color filter 22 arranged to face pixel PX3 is colored in blue. That is, pixel PX3 is a pixel for displaying a blue color (B).

In FIG. 4, the black matrix 21 and the columnar spacer 30 provided on the counter substrate CT to face each of pixels PX1 to PX3 are indicated by broken lines. The black matrix 21 includes first portions 21a overlapping with gate lines Gi and Gi+1 and extending in the X-direction. Furthermore, the black matrix 21 includes second portions 21b overlapping with source lines Sj to Sj+3 and extending between gate lines Gi and Gi+1. Further, the longitudinal ends of the branches PBR of the pixel electrode PE and the longitudinal ends of the slits PSL are covered with the black matrix 21. Both ends of each of the second portions 21b are connected to each of the first portions 21a, and the apertures AP1 to AP3 corresponding to pixels PX1 to PX3, respectively, are formed.

The columnar spacer 30 is provided in a position overlapping with a first portion 21a of the black matrix 21. In the example shown in FIG. 4, the columnar spacer 30 is provided above a portion in which the gate line Gi overlaps with the source line Sj+1, but may be provided in another position overlapping with the first portion 21a of the black matrix 21. Further, in the example shown in FIG. 4, only one columnar spacer 30 is shown for three pixels PX1 to PX3; however, more columnar spacers 30 may be provided above the gate line Gi or the gate line Gi+1 near each of pixels PX1 to PX3. Alternatively, one columnar spacer 30 may be provided for at least four pixels PX.

Here, alignment treatment performed on the first alignment film AL1 provided on the array substrate AR and the second alignment film AL2 provided on the counter substrate CT will be described.

A process of manufacturing a liquid crystal display includes a process for performing the alignment treatment by a photo-alignment method on the first alignment film AL1. That is, the surface of the first alignment film AL1 is irradiated with ultraviolet rays of linear polarization after the first alignment film AL1 is formed on the fourth insulating film 14 and the pixel electrode PE at the time of manufacturing the array substrate AR. Then, anisotropy occurs on the surface of the first alignment film AL1, and alignment capability orienting liquid crystal molecules toward a first alignment treatment direction is provided to the first alignment film AL1.

Further, the manufacturing process of the liquid crystal display includes a process of performing the alignment treatment by a rubbing method on the second alignment film AL2. That is, in the manufacturing process of the counter substrate CT, a rotating roller winded by a rubbing material is scanned on the surface of the second alignment film AL2 in a rubbing direction (second alignment axis R2) after the second alignment film AL2 is formed on the overcoat layer 23 and the columnar spacer 30. Then, the surface of the second alignment film AL2 is unidirectionally rubbed by a rubbing material, and alignment capability orienting liquid crystal molecules toward the second alignment axis R2 is provided to the second alignment film AL2. As the rubbing material, for example, rayon can be used.

In the FFS mode or IPS mode, liquid crystal molecules are switched by a lateral electric field having a direction component in an X-Y plane in planar view. To prevent burn-in, it is necessary to provide high anchoring strength to the first alignment film AL1 and the second alignment film AL2 and to surely return the liquid crystal molecules switched by the lateral electric field to an initial alignment direction in the off state (after generation of the lateral electric field stops).

The anchoring strength referred to in this embodiment is so-called azimuth anchoring strength, and represents a size of interaction between an alignment film and liquid crystal molecules. In general, increment $\Delta F$ of surface free energy when a surface director representing an average alignment direction of liquid crystal molecules on an alignment film surface is shifted by $\Delta \Psi$ from a direction of the surface director (axis of easy alignment) in a state where deforming stress (elastic force) is not applied to a liquid crystal is given by $$\Delta F = \frac{1}{2} A \sin^2(\Delta \psi) \tag{1}$$

where A is the anchoring strength.

Anchoring strength A can be measured by, for example, a torque balance method. In the torque balance method, a pair of substrates on which an alignment film is formed are bonded to form predetermined cell gap d between the substrates, and a sample enclosing a liquid crystal to which a chiral material (hereinafter referred to simply as chiral) is added and a host crystal to which the chiral is not added is manufactured. In the sample, twist angle $\phi_1$ of the host crystal to which the chiral is not added in planar view and twist angle $\phi_2$ of the liquid crystal to which elastic force and self twist capacity are provided in accordance with the addition of the chiral in planar view are measured. Anchoring strength A is given by $$A = \frac{2K_2(2\pi d/p - \phi_2)}{d \sin(\phi_2 - \phi_1)} \tag{2}$$

where $\phi_1$ and $\phi_2$ are the twist angles; $K_2$ is the twist elastic coefficient of the liquid crystal; p is the helical pitch of the liquid crystal to which the chiral is added; and d is the cell gap, the anchoring strength being that measured by the torque balance method.

In general, high anchoring strength indicates approximately $10^{\wedge}(-4)$ to $10^{\wedge}(-3)$ J/m². In particular, high anchoring strength of approximately $10^{\wedge}(-3)$ J/m² is preferably provided to an alignment film in the FFS mode or IPS mode in which the liquid crystal molecules are switched by the lateral electric field. From this point of view, first anchoring strength provided to the first alignment film AL1 by the photo-alignment method and second anchoring strength provided to the second alignment film AL2 by the rubbing method are determined to be, for example, greater than or equal to $10^{\wedge}(-4)$ J/m². Desirably, the first anchoring strength and the second anchoring strength are determined to be approximately $10^{\wedge}(-3)$ J/m².

In this embodiment, the first anchoring strength and the second anchoring strength are set to be substantially the same, or the first anchoring strength (anchoring strength on a side of the array substrate AR) is set to be greater. That is, high anchoring strength is provided to both the first alignment film AL1 and the second alignment film AL2. Accordingly, high alignment restraining force is provided over the entire area of the liquid crystal layer LQ in a thickness direction, and an effect of preventing burn-in can be improved.

Here, the first anchoring strength provided to the first alignment film AL1 is defined as $A_1 = a_1 \times 10^{\wedge}(-a_2)$, and the second anchoring strength provided to the second alignment film AL2 is defined as $A_2 = b_1 \times 10^{\wedge}(-b_2)$. In this embodiment, based on the criterion of providing high anchoring strength to the first alignment film AL1 by the photo-alignment method, $a_1$ and $a_2$ are determined such that $$0 < a_2 \leq 4 \tag{3}$$

$$1 \leq a_1 < 10. \tag{4}$$

Further, in this embodiment, based on the criterion of setting the first anchoring strength provided to the first alignment film AL1 by the photo-alignment method and the second anchoring strength provided to the second alignment film AL2 by the rubbing method to be substantially the same, or setting the first anchoring strength to be greater, and providing high anchoring strength also to the second alignment film AL2, $a_2$, $b_1$ and $b_2$ are determined such that $$0 < a_2 \leq b_2 \leq 4 \tag{5}$$

$$1 \leq b_1 < 10. \tag{6}$$

"Substantially the same" described above does not necessarily mean that the first anchoring strength is identical to the second anchoring strength. In general, the anchoring strength provided to the alignment film of the liquid crystal panel may be an order of approximately $10^{\wedge}(-3)$ J/m² as described above, and may be an order of approximately $10^{\wedge}(-6)$ J/m². Considering that the anchoring strength provided to the alignment film is selected from a wide range of order, two types of anchoring strength can be considered to be substantially the same even if they are different by, for example, approximately $10^{-2}$ (approximately double-digit difference).

As an example, the first anchoring strength is set $3 \times 10^{-3}$ J/m$^2$, and the second anchoring strength is set $2 \times 10^{-3}$ J/m$^2$ or $4.5 \times 10^{-3}$ J/m$^2$. The first anchoring strength and the second anchoring strength can be considered to be substantially the same, since they are different merely by approximately 1.5 times.

The anchoring strength provided to the first alignment film AL1 by the photo-alignment method can be adjusted by changing an accumulated amount of light of ultraviolet rays with which, for example, the first alignment film AL1 is irradiated. Further, the anchoring strength provided to the second alignment film AL2 by the rubbing method can be adjusted by changing, for example, the number of rotations of a roller, a scan rate of the roller and force put on the second alignment film AL2 by the roller.

Subsequently, an operation of the liquid crystal display according to this embodiment will be described.

In this embodiment, alignment treatment by the photo-alignment method is performed on the first alignment film AL1 on the side of the array substrate AR. On the other hand, if alignment treatment by the rubbing method is performed on the first alignment film AL1, an area in which alignment capability is not fully provided may be produced on the first alignment film AL1.

Figure 5:
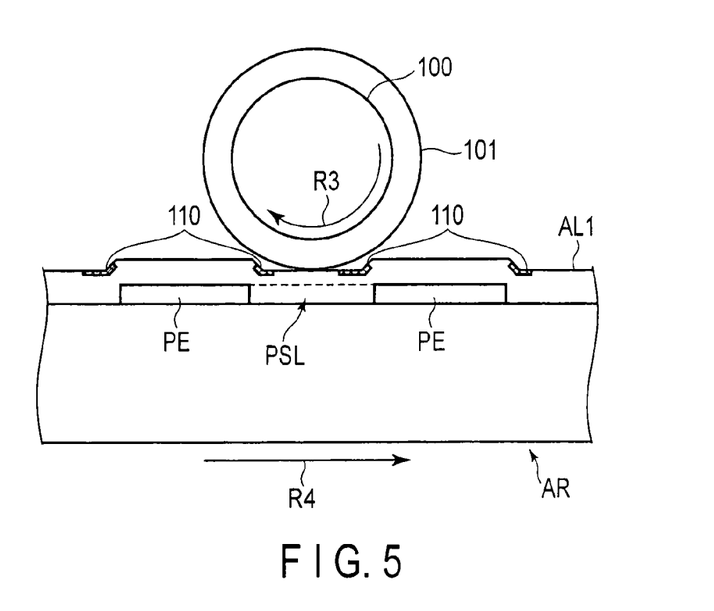
FIG. 5 is a schematic view showing that an alignment film on a side of an array substrate is rubbed.

FIG. 5 is a schematic view for describing above problem, and shows that the first alignment film AL1 on the side of the array substrate AR is rubbed by a rubbing material 101 winded around a roller 100. The roller 100 rotates in rotational direction R3 shown in the figure. The array substrate AR is conveyed, for example, in rubbing direction R4 shown in the figure with the roller 100 rotated. Rubbing direction R4 is consistent with the first alignment axis R1 shown in, for example, FIG. 3.

Since pixel electrodes PE are arranged directly below the first alignment film AL1 on the array substrate AR, projections and depressions caused by the pixel electrodes PE are produced on a surface of the first alignment film AL1. Further, projections and depressions caused by the gate line G and the source line S are also produced on the surface of the first alignment film AL1. An alignment defective area 110 in which alignment capability is not fully provided may be produced on the surface of the first alignment film AL1 because of the projections and depressions.

If the first alignment axis R1 is parallel to the X-direction, both edges of the pixel electrode PE in the X-direction and both edges of the slit PSL along the long axis intersect at angle θ1 nearly perpendicular to rubbing direction R4. The alignment defective area 110 as described above is easily produced around upstream and downstream edges in rubbing direction R4 of a projection produced on the surface of the first alignment film AL1 by the pixel electrode PE. If a normally black mode, in which black is displayed when voltage is not applied, is attempted to be realized in a liquid crystal display manufactured using the array substrate AR, for example, the liquid crystal layer LQ, alignment directions of liquid crystal molecules present near the alignment defective area 110 may not be made uniform (alternatively, the liquid crystal molecules may not return to an initial alignment state), and so-called light leakage may occur because of such an alignment defect. Further, since alignment capability is not fully provided from the first alignment film AL1 to the liquid crystal molecules present near the alignment defective area 110, burn-in is significantly generated near the alignment defective area 110.

On the other hand, if alignment capability is provided to the first alignment film AL1 in a non-contact manner by the photo-alignment method as in this embodiment, high alignment capability can be uniformly provided on all the surface of the first alignment film AL1 regardless of the projections and depressions on the surface of the first alignment film AL1 caused by the pixel electrode PE, etc. Accordingly, the generation of light leakage or burn-in can be reduced or prevented.

If the alignment treatment by the rubbing method is performed on the first alignment film AL1, the rubbing material 101 is sometimes partially transformed because of the projections and depressions on the surface of the first alignment film AL1 as rubbing progresses. A difference may occur in alignment capability provided to the first alignment film AL1 because of the transformed portion, and a difference of transmittance may be visually recognized as display unevenness (or rubbing stripe). If alignment capability is provided to the first alignment film AL1 in a non-contact manner by the photo-alignment method as in this embodiment, the generation of display unevenness can also be controlled.

Further, the alignment treatment by the rubbing method is performed on the second alignment film AL2 on the side of the counter substrate CT in this embodiment. On the other hand, if the alignment treatment by the photo-alignment method is performed on the second alignment film AL2, the color filter 22 may be faded by ultraviolet irradiation in treatment processing. Further, if the overcoat layer 23 and the color filter 22 directly below the second alignment film AL2 are constituted of an organic material, part of them is decomposed by ultraviolet irradiation, and impurities are produced, which may cause reliability of the liquid crystal display to be deteriorated.

On the other hand, if alignment capability is provided to the second alignment film AL2 by the rubbing method as in this embodiment, the color filter 22 or the overcoat layer 23 is not irradiated with ultraviolet rays at the time of alignment treatment. This prevents the color filter 22 from being faded and prevents impurities from being generated.

A ground of the second alignment film AL2 is substantially flattened by the overcoat layer 23. Thus, projections and depressions are hardly produced on the surface of the second alignment film AL2 because of the ground. On the other hand, projections and depressions are locally produced on the surface of the second alignment film AL2, since the columnar spacer 30 is scattered on the overcoat layer 23, as shown in, for example, FIG. 2. Thus, even if alignment treatment by the rubbing method is performed on the second alignment film AL2, an alignment defective area is produced near the columnar spacer 30, and light leakage and burn-in originated in this area may be generated. On the other hand, in this embodiment, the columnar spacer 30 is provided in a position completely overlapping with the black matrix 21, as described using FIG. 4.

In particular, in this embodiment, the first portion 21a of the black matrix 21 extending in the X-direction and the columnar spacer 30 overlap with each other on the upper side of the gate line G, and the rubbing direction (second alignment axis R2) is parallel to the X-direction. Considering that, as described above, the alignment defective area is easily produced around the upstream and downstream edges in the rubbing direction of the projection on the alignment film surface, the alignment defective area caused by the columnar spacer 30 can be surely overlapped with the black matrix 21 by defining the black matrix 21, the columnar spacer 30 and the rubbing direction (second alignment axis R2) as in this embodiment. Thus, the alignment defective area produced because of the columnar spacer 30 exerts little influence on display quality.

Impurities may be produced by irradiating an organic material with ultraviolet rays also on the side of the array substrate AR. However, the array substrate AR includes the pixel electrode PE, the common electrode CE and the fourth insulating film 14 constituted of an inorganic material near the first alignment film AL1, and the pixel electrode PE, the common electrode CE and the fourth insulating film 14 absorb at least a part of ultraviolet rays. Thus, even if an organic material is used for an element constituting the array substrate AR, the amount of light of ultraviolet rays reaching the element can be reduced. Moreover, if impurities are generated, elution of the impurities to the liquid crystal layer LQ can be blocked by the pixel electrode PE, the common electrode CE and the fourth insulating film 14.

The inventors of the present application manufactured liquid crystal display A (liquid crystal display according to this embodiment) in which the alignment treatment by the photo-alignment method was performed on the first alignment film AL1 and the alignment treatment by the rubbing method was performed on the second alignment film AL2, liquid crystal display B in which the alignment treatment by the rubbing method was performed on both the first alignment film AL1 and the second alignment film AL2, and liquid crystal display C in which the alignment treatment by the photo-alignment method was performed on both the first alignment film AL1 and the second alignment film AL2, and evaluated performance of them. Liquid crystal displays A to C have the same structure except for the methods by which the alignment treatment was performed on the first alignment film AL1 and the second alignment film AL2.

After a checker pattern of black and white is displayed on liquid crystal displays A to C for two hours under an environmental temperature of 45°, generation of burn-in was evaluated by displaying a grey screen and observing a persistence state of the checker pattern. As a result, burn-in was not produced on liquid crystal display A or C. On the other hand, surface burn-in and line burn-in originated in the alignment defective area were generated on liquid crystal display B.

Further, when reliability (occurrence frequency of breakdown or malfunction, etc.) of liquid crystal displays A to C was evaluated, it was found that the reliability of liquid crystal display A was the highest. Further, when transmittance of liquid crystal displays A to C was evaluated, it was found that liquid crystal display A and liquid crystal display B had similar transmittance, and only the transmittance of liquid crystal display C was worse. This is mainly because the color filter 22 was faded by ultraviolet irradiation of the photo-alignment treatment performed on the second alignment film AL2 in liquid crystal display C. In addition, when contrast of liquid crystal displays A to C was evaluated, it was found that they had similar contrast.

From the above evaluation result, it is found that this embodiment allows malfunction conventionally occurred in the alignment treatment to the alignment film to be resolved and allows a liquid crystal display showing excellent display quality and reliability to be obtained by taking advantages of the rubbing method and the photo-alignment method.

In addition, various suitable operations can be obtained from the structure disclosed in this embodiment.

The structure disclosed in the above-described embodiment can be properly modified and carried out. Some modifications are shown below.

(First Modification)

Although the liquid crystal layer LQ is constituted using a liquid crystal material having negative dielectric anisotropy in the above embodiment, the liquid crystal layer LQ may be constituted using liquid crystal molecules having positive dielectric anisotropy.

Figure 6:
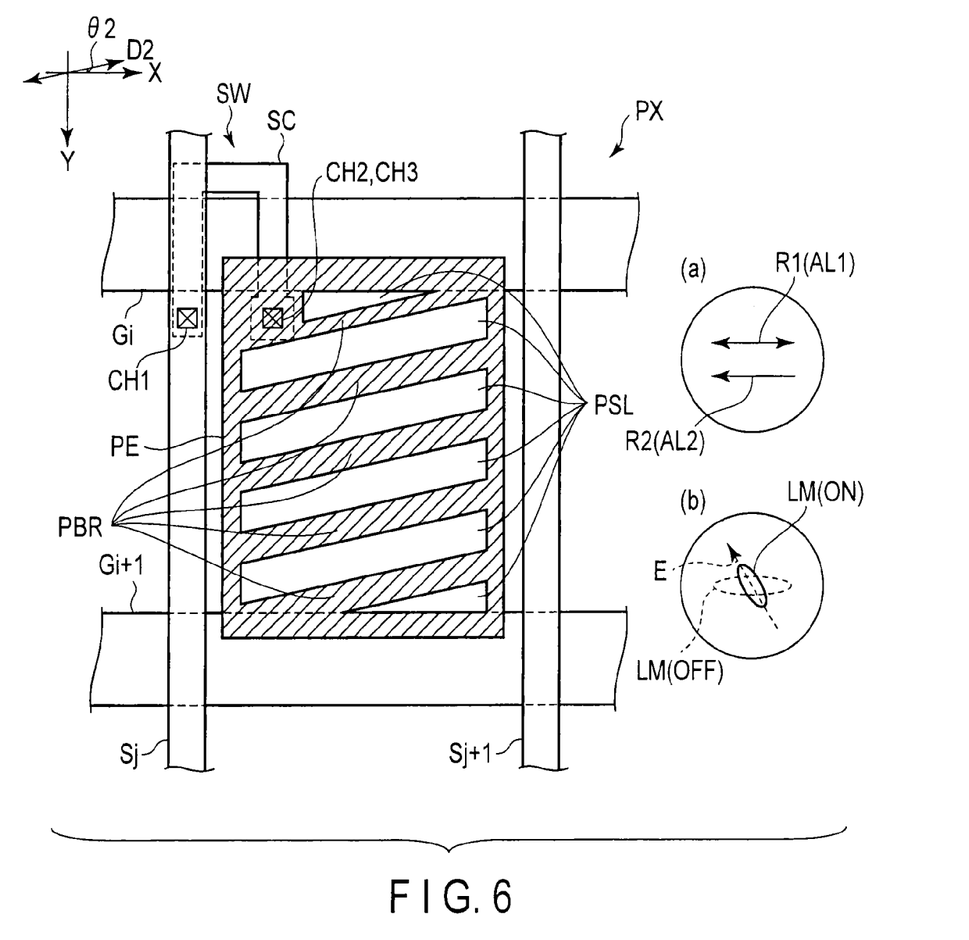
FIG. 6 is a plan view schematically showing a pixel in a first modification.

FIG. 6 schematically shows a configuration example of a pixel PX which may be adopted when the liquid crystal layer LQ is constituted using liquid crystal molecules having positive dielectric anisotropy. The area of the pixel PX shown in the figure is defined by gate lines Gi and Gi+1 extending along the X-direction and source lines Sj and Sj+1 extending along the Y-direction. The semiconductor layer SC constituting the switching element SW is bent and formed to overlap with the gate line Gi twice. The semiconductor layer SC is electrically connected to the source line Sj through contact hole CH1. Further, the semiconductor layer SC is electrically connected to the pixel electrode PE through contact holes CH2 and CH3. The pixel electrode PE includes a plurality of branches PBR extending from above the gate line Gi to above the gate line Gi+1 along a second extending direction D2 inclined counterclockwise angle θ2 less than or equal to 45° relative to the X-direction. Further, the pixel electrode PE includes four slits PSL extending from one edge to the other edge in the X-direction. The slits PSL have the same shape and extend along the second extending direction D2. Angle θ2 is an angle comparatively small, for example, approximately 5 to 15°.

As shown in, for example, (a) of FIG. 6, the alignment treatment by the photo-alignment method is performed on the first alignment film AL1 along the first alignment axis R1 parallel to the X-direction in an X-Y plane, and the alignment treatment by the rubbing method is performed on the second alignment film AL2 along the second alignment axis R2 opposite to the first alignment axis R1 in the X-Y plane. The first alignment axis R1 and the second alignment axis R2 may be parallel to each other and in the same direction. The liquid crystal molecule LM of the liquid crystal layer LQ is oriented such that its long axis faces the first alignment axis R1 and the second alignment axis R2 as indicated by broken lines in (b) of FIG. 6 in a state where an electric field is not formed between the pixel electrode PE and the common electrode CE (off state). A lateral electric field (fringe electric field) is formed between the pixel electrode PE and the common electrode CE in a state where a potential difference is formed between the pixel electrode PE and the common electrode CE (on state). The liquid crystal molecule LM is affected by the electric field, and rotates its long axis on a plain surface substantially parallel to the X-Y plane in planar view, as indicated by a solid line in (b) of FIG. 6. In this modification, the liquid crystal layer LQ has positive dielectric anisotropy, as described above. Thus, the liquid crystal molecule LM rotates such that its long axis faces a direction of an electric line of force E in the lateral electric field. Advantages similar to those of the above embodiment can be obtained even in this modification.

Here, suppose the alignment treatment by the rubbing method is performed on the first alignment film AL1 in a structure in which the slits PSL extend at comparatively small angle θ relative to the X-direction as in this modification. In this case, the rubbing direction (first alignment axis R1) intersects edges along the long axes of the slits PSL at a small angle. Thus, the alignment defective area is hard to occur in a recess on the surface of the first alignment film AL1 caused by the slits PSL. Thus, the advantage obtained by performing the alignment treatment on the first alignment film AL1 by the photo-alignment method is clear, especially, when the liquid crystal layer LQ is constituted of a liquid crystal material having negative dielectric anisotropy, and the long axes of the slits PSL of the pixel electrode PE intersects the first alignment treatment direction at an angle nearly perpendicular, as in the embodiment.

(Second Modification)

Although the liquid crystal display including the liquid crystal panel of the FFS mode is shown as an example in the embodiment, the method of the alignment treatment and the structure concerning the arrangement of the columnar spacer in the embodiment can be applied also to the liquid crystal panel of the IPS mode.

Figure 7:
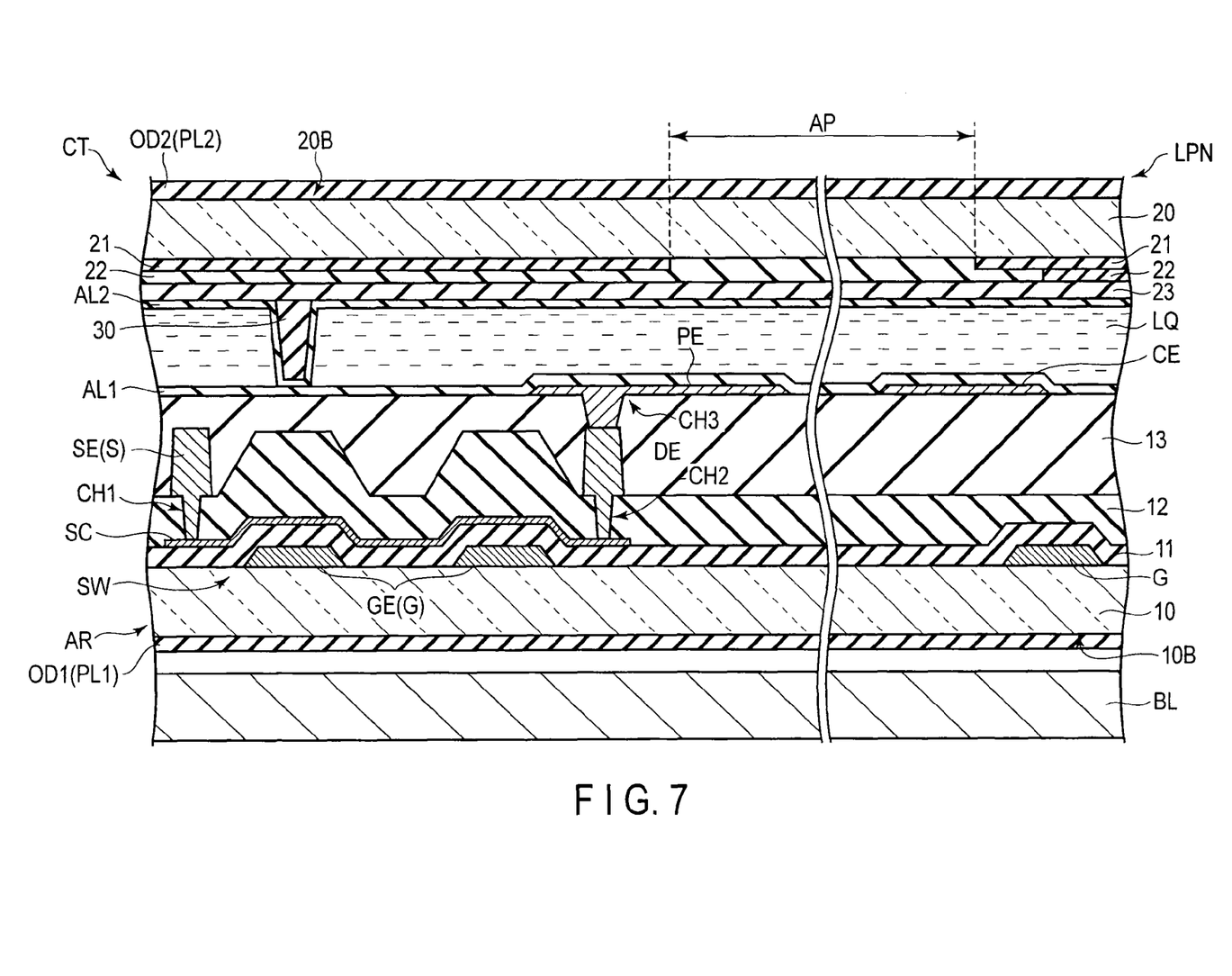
FIG. 7 is a schematic sectional view of a liquid crystal display according to a second modification.

FIG. 7 is a schematic sectional view showing a liquid crystal display including the liquid crystal panel LPN to which the IPS mode is applied. In the figure, an arrangement position, scale, etc., of each element are properly adjusted and shown for simplification. When the liquid crystal display shown in FIG. 7 is compared with that shown in FIG. 2, it is different in that a pixel electrode PE and a common electrode CE are arranged above the third insulating film 13, the pixel electrode PE and the common electrode CE are covered with the first alignment film AL1, and the fourth insulating film 14 is not present. The liquid crystal layer LQ has negative dielectric anisotropy as well as, for example, in the embodiment. Further, the columnar spacer 30 is provided above the gate line G and in a position completely overlapping with the black matrix 21 from the perspective of the normal direction of the main surface of substrate (X-Y plane) as well as in the embodiment.

Figure 8:
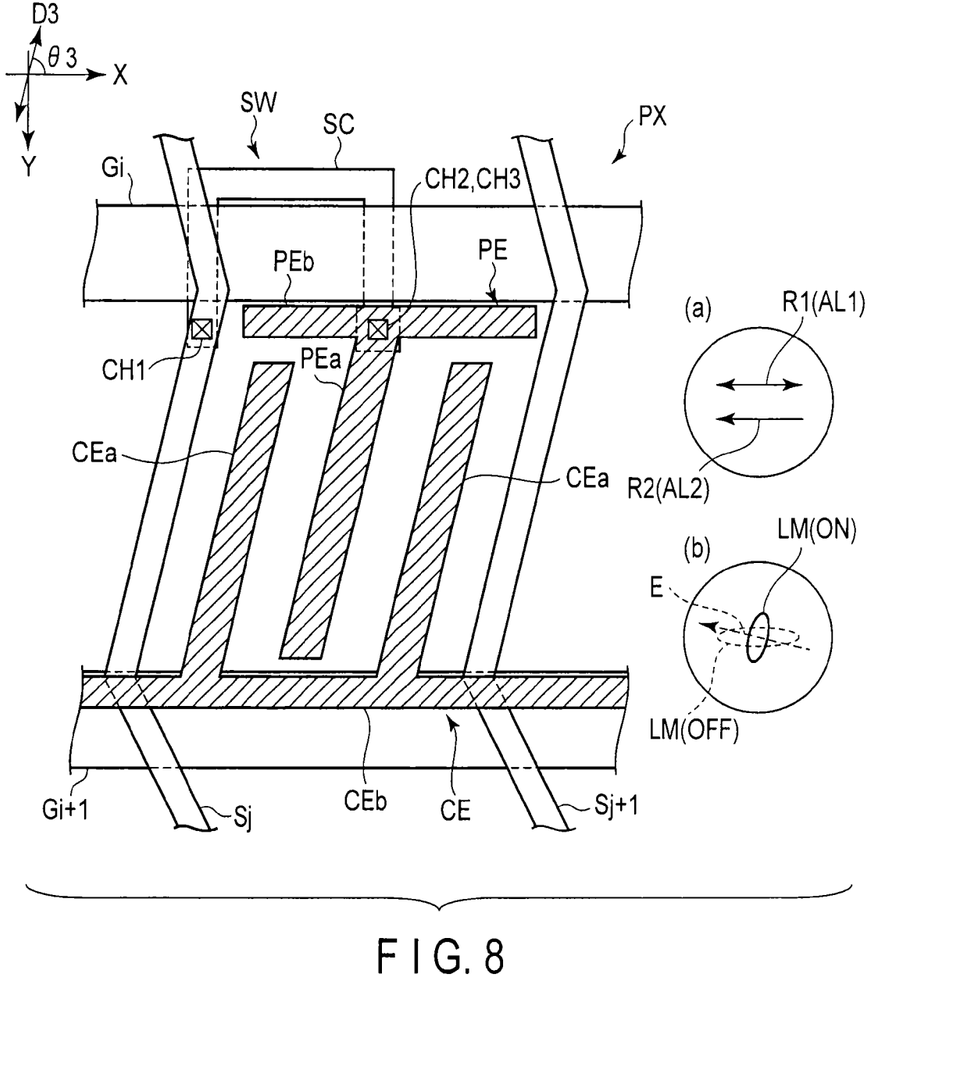
FIG. 8 is a plan view schematically showing a pixel in the second modification.

FIG. 8 is a schematic plan view showing a structure of one pixel PX on the array substrate AR from the perspective of the side of the counter substrate CT with respect to the liquid crystal display shown in FIG. 7. Here, only a main portion necessary for description is shown. The area of the pixel PX shown in the figure is defined by gate lines Gi and Gi+1 extending along the X-direction and source lines Sj and Sj+1 extending along the Y-direction. The semiconductor layer SC constituting the switching element SW is bent and formed to overlap with the gate line Gi twice. The semiconductor layer SC is electrically connected to the source line Sj through contact hole CH1. Further, the semiconductor layer SC is electrically connected to the pixel electrode PE through contact holes CH2 and CH3.

The pixel electrode PE includes a main pixel electrode PEa extending along a third extending direction D3 inclined counterclockwise angle θ3 less than or equal to 45° relative to the X-direction, and a sub-pixel electrode PEb connected to the main pixel electrode PEa and extending in the X-direction between source lines Sj and Sj+1. Angle θ3 is an angle nearly perpendicular, for example, approximately 75 to 85°. The common electrode CE formed in the same layer as that of the pixel electrode PE includes two main common electrodes CEa arranged to sandwich the main pixel electrode PEa and extending along the third extending direction D3, and a sub-common electrode CEb connected to the main common electrodes CEa and extending in the X-direction on the upper side of the gate line Gi+1. In the example shown in the figure, each of source lines Sj and Sj+1 extends along the third extending direction D3 between the gate line Gi and the gate line Gi+1.

As shown in, for example, (a) of FIG. 8, the alignment treatment by the photo-alignment method is performed on the first alignment film AL1 along the first alignment axis R1 parallel to the X-direction in an X-Y plane, and the alignment treatment by the rubbing method is performed on the second alignment film AL2 along the second alignment axis R2 opposite to the first alignment axis R1 in the X-Y plane. The first alignment axis R1 and the second alignment axis R2 may be parallel to each other and in the same direction. The liquid crystal molecule LM of the liquid crystal layer LQ is oriented such that its long axis faces the first alignment axis R1 of the first alignment film AL1 and the second alignment axis R2 of the second alignment film AL2 as indicated by broken lines in (b) of FIG. 8 in a state where an electric field is not formed between the pixel electrode PE and the common electrode CE (off state). A lateral electric field is formed mainly between the main pixel electrode PEa and the main common electrodes CEa in a state where a potential difference is formed between the pixel electrode PE and the common electrode CE (on state). The liquid crystal molecule LM is affected by the electric field, and its long axis rotates on a plain surface substantially parallel to the X-Y plane, as indicated by a solid line in (b) of FIG. 8. In this modification, the liquid crystal layer LQ has negative dielectric anisotropy, as described above. Thus, the liquid crystal molecule LM is oriented such that its long axis faces the electric line of force E of the lateral electric field. Such switching of the liquid crystal molecule LM allows transmission of light from the backlight BL to be controlled.

Advantages similar to those of the embodiment can be obtained in the liquid crystal display including the liquid crystal panel LPN of the IPS mode as described above. Further, a common electrode is provided on a side of a second substrate, and can be applied to the liquid crystal display in which a liquid crystal is driven using an electric field in an oblique direction or a perpendicular direction relative to a substrate between a pixel electrode and the common electrode. It should be noted that a direction of alignment in the alignment treatment by the rubbing method, for example, the rubbing direction of the second alignment film AL2 indicated by R2 in (a) of FIG. 3 may be reversed. Further, the columnar spacer 30 is provided on the side of the second substrate. However, a projection may be provided on a first substrate facing a columnar spacer of the second substrate to define the thickness of a liquid crystal layer by the columnar spacer and the projection. Further, the columnar spacer may be provided on the first substrate. This allows projections and depressions produced at the time of the rubbing treatment of the second substrate to be reduced. The spacer need not be columnar. It may be cone-shaped.

All structures which may be carried out by a person with ordinary skill in the art by properly changing their design based on each of the structures described above as the embodiment of the present invention and its modifications belong to the scope of the present invention as long as the structures include the gist of the present invention.

Further, other operations and advantages obtained by the forms described in this embodiment which are clear from the description of this specification, or can be properly conceived by a person with ordinary skill in the art are naturally considered to be obtained by the present invention.

What is claimed is:

1. A liquid crystal display comprising:
   a first substrate comprising a first line, a second line, a switching element electrically connected to the first line and the second line, a pixel electrode electrically connected to the switching element, a common electrode formed through a plurality of pixels, and a first alignment film provided above the pixel electrode and the common electrode;

a second substrate comprising a second alignment film facing the first alignment film; and a liquid crystal layer including a liquid crystal molecule kept between the first alignment film and the second alignment film, wherein first anchoring strength is provided on the first alignment film which is a photo-alignment film, and second anchoring strength is provided on the second alignment film which is a rubbing alignment film, and the first anchoring strength is substantially equal to or greater than the second anchoring strength, and equations (1) and (2) below are satisfied if $A_1 = a_1 \times 10^{\wedge}(-a_2)$, where $A_1$ is the first anchoring strength provided to the first alignment film, $$0 < a_2 \leq 4 \tag{1}$$

$$1 \leq a_1 \leq 10 \tag{2}$$

2. The liquid crystal display of claim 1, wherein the second substrate further comprises a color filter.

3. The liquid crystal display of claim 1, wherein a first alignment treatment direction of the first alignment film and a second alignment treatment direction of the second alignment film are parallel to an arrangement direction of the second line, the second substrate comprises:

a light shielding layer overlapping with the first line and extending in the arrangement direction; and a spacer provided in a position overlapping with the light shielding layer, the first substrate and the second substrate face each other across the spacer, and the liquid crystal layer is enclosed in a cell gap formed between the first alignment film and the second alignment film by the spacer.

4. The liquid crystal display of claim 3, wherein the first substrate further comprises an insulating film arranged between the pixel electrode and the common electrode, the pixel electrode includes a slit extending along the second line and facing the common electrode, and dielectric anisotropy of the liquid crystal molecule is negative.

5. The liquid crystal display of claim 1, wherein equations (3) and (4) below are satisfied if $A_2 = b_1 \times 10^{\wedge}(-b_2)$, where $A_2$ is the second anchoring strength provided to the second alignment film, $$0 < a_2 \leq b_2 \leq 4 \tag{3}$$

$$1 \leq b_1 < 10 \tag{4}$$

6. A method of manufacturing a liquid crystal display, the liquid crystal display comprising:

a first substrate comprising a first line, a second line, a switching element electrically connected to the first line and the second line, a pixel electrode electrically connected to the switching element, a common electrode formed through a plurality of pixels, and a first alignment film provided above the pixel electrode and the common electrode;

a second substrate comprising a second alignment film facing the first alignment film; and a liquid crystal layer including a liquid crystal molecule kept between the first alignment film and the second alignment film, the method comprising:

providing first anchoring strength to the first alignment film which is a photo-alignment film; and providing second anchoring strength to the second alignment film which is a rubbing alignment film, wherein the first anchoring strength is substantially equal to or greater than the second anchoring strength, and equations (1) and (2) below are satisfied if $A_1 = a_1 \times 10^{\wedge}(-a_2)$, where $A_1$ is the first anchoring strength provided to the first alignment film, $$0 < a_2 \leq 4 \tag{1}$$

$$1 \leq a_1 < 10 \tag{2}$$

7. The method of manufacturing a liquid crystal display of claim 6, wherein equations (3) and (4) below are satisfied if $A_2 = b_1 \times 10^{\wedge}(-b_2)$, where $A_2$ is the second anchoring strength provided to the second alignment film, $$0 < a_2 \leq b_2 \leq 4 \tag{3}$$

$$1 \leq b_1 < 10 \tag{4}$$

* * * * *